(12) United States Patent
Salovuori

(10) Patent No.: US 7,606,261 B2
(45) Date of Patent: Oct. 20, 2009

(54) CALL ROUTING IN A TELECOMMUNICATION SYSTEM

(75) Inventor: Heikki Salovuori, Helsinki (FI)

(73) Assignee: Nokia Corporation, Espoo (FI)

( * ) Notice: Subject to any disclaimer, the term of this patent is extended or adjusted under 35 U.S.C. 154(b) by 757 days.

(21) Appl. No.: 10/153,180

(22) Filed: May 23, 2002

(65) Prior Publication Data

US 2002/0196781 A1    Dec. 26, 2002

Related U.S. Application Data

(63) Continuation of application No. PCT/FI00/01044, filed on Nov. 29, 2000.

(30) Foreign Application Priority Data

Dec. 2, 1999    (FI) .................................. 19992593

(51) Int. Cl.
*H04J 3/16*    (2006.01)
(52) U.S. Cl. ..................................................... 370/466
(58) Field of Classification Search ........................ None
See application file for complete search history.

(56) References Cited

U.S. PATENT DOCUMENTS

| | | | | |
|---|---|---|---|---|
| 5,729,537 | A * | 3/1998 | Billstrom | 370/329 |
| 5,889,954 | A * | 3/1999 | Gessel et al. | 709/223 |
| 6,026,296 | A * | 2/2000 | Sanders, III et al. | 455/426.1 |
| 6,073,015 | A * | 6/2000 | Berggren et al. | 455/432.2 |
| 6,081,705 | A * | 6/2000 | Houde et al. | 455/411 |
| 6,181,935 | B1 * | 1/2001 | Gossman et al. | 455/433 |
| 6,396,828 | B1 * | 5/2002 | Liu | 370/352 |
| 6,427,071 | B1 * | 7/2002 | Adams et al. | 455/403 |
| 6,493,551 | B1 * | 12/2002 | Wang et al. | 455/432.1 |

(Continued)

FOREIGN PATENT DOCUMENTS

FI        98027        3/1997

(Continued)

OTHER PUBLICATIONS

Hobson et al., "Opportunities for multimedia transmission on Dimetra," IEE Seminar on Tetra Market and Technology Developments, Feb. 2000, pp. 5/1-5/6.

(Continued)

*Primary Examiner*—Robert W Wilson
(74) *Attorney, Agent, or Firm*—Pillsbury Winthrop Shaw Pittman, LLP

(57) ABSTRACT

A method of routing calls in a telecommunication system including a mobile services switching center (MSC) and a base station connected thereto, and mobile stations wherefrom a telecommunication connection is established by using a first predetermined protocol on a radio connection. The telecommunication system further includes a packet data network, a server communicating with the MSC and the packet data network, wherefrom a telecommunication connection is established through the packet data network and the server to the MSC. In the server, messages according to the first protocol supplied from the MSC are as such arranged into data packets of data network protocol to be forwarded through the packet data network to the terminal. The terminal transmits and receives the messages according to the first protocol arranged as such into the data packets of the packet data network protocol and emulates a mobile station using the first protocol.

24 Claims, 3 Drawing Sheets

U.S. PATENT DOCUMENTS

Figure 1:
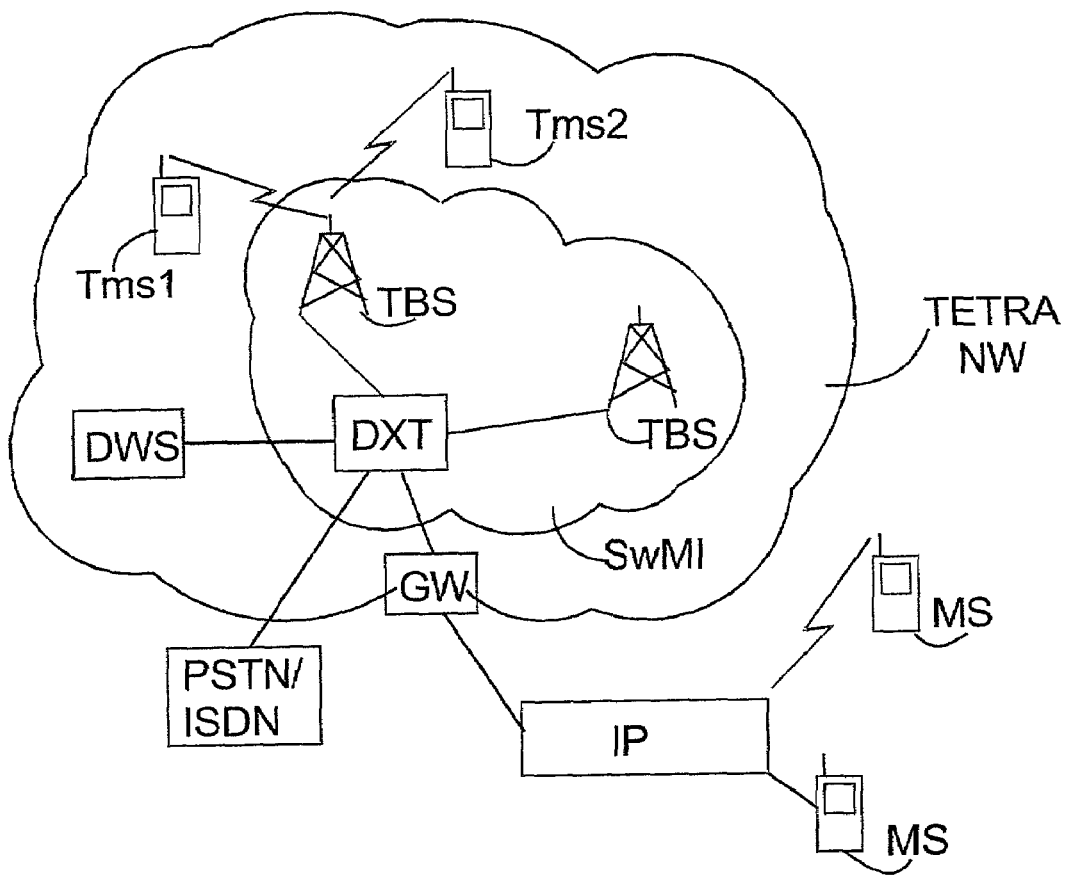

| | | | |
|---|---|---|---|
| 6,542,516 B1 * | 4/2003 | Vialen et al. | 370/465 |
| 6,594,253 B1 * | 7/2003 | Sallberg et al. | 370/349 |
| 6,611,684 B1 * | 8/2003 | Franks | 455/433 |
| 6,853,851 B1 * | 2/2005 | Rautiola et al. | 455/553.1 |
| 7,120,418 B2 * | 10/2006 | Herajarvi et al. | 455/406 |

FOREIGN PATENT DOCUMENTS

| | | |
|---|---|---|
| WO | WO 96/21983 | 7/1996 |
| WO | WO 96/21984 | 7/1996 |
| WO | WO 97/27692 | 7/1997 |
| WO | WO 98/27698 | 6/1998 |
| WO | WO 98/52327 | 11/1998 |
| WO | WO 98/57482 | 12/1998 |
| WO | WO 99/48312 | 9/1999 |
| WO | WO 99/62235 | 12/1999 |
| WO | WO 00/79744 | 12/2000 |

OTHER PUBLICATIONS

TETRA, ETS 300 392 3-1, Jan. 1999, Terrestrial Trunked Radio (TETRA): Voice plus Data (V+D); Part 3: Interworking at the Inter-System Interface (ISI); Sub-part 1: General Design, 44 p.

Internet Engineering Task Force IETF, Request for Comments (RCF) 2002 for C. Perkins, editor, IP Mobility Support, 74 pp.

Mouly and Pautet, "The GSM System for Mobile Communications," France, 1992.

* cited by examiner

CALL ROUTING IN A TELECOMMUNICATION SYSTEM

This is a Continuation Application of International Application No. PCT/FI00/01044, filed Nov. 29, 2000, which was published as WO 01/45335 on Jun. 21, 2001. This application is based upon and claims benefit of priority from Findland Patent Application No. 19992593, filed on Dec. 1, 1999, the entire contents of which are incorporated herein by reference.

BACKGROUND OF THE INVENTION

The invention relates to a shared use of different wireless telecommunication systems and terminals thereof, and particularly to a method of extending coverage areas of private networks.

A method of the invention is applicable to any wireless telecommunication network and terminals thereof. The invention is particularly well suited for use in private networks of the Private Mobile Radio or Professional Mobile Radio PMR type, i.e. trunking networks, which are typically company networks or official networks wherein all channels are used by one or more companies or official organizations. As digital networks attract the most interest in the development of wireless telecommunication systems, the company networks have also been provided with digital standards. An example of a digital radio telephone system or mobile communication system whereto the present invention can be applied is a Trans-European Trunked Radio or Terrestrial Trunked Radio TETRA system. The implementation of the TETRA system is described in the standard ETS 300 392-2, March 1996, *Radio Equipment and Systems (RES); Trans-European Trunked Radio (TETRA); Voice plus Data (V+D) Part 2: Air Interface (AI), ETSI*, 583 pages.

The TETRA is a mobile communication system which operates at a 380 to 520 MHz radio frequency band and uses Time Division Multiple Access TDMA modulation. A 56.67 ms long TDMA frame is divided into four time slots, i.e. one frame can comprise four traffic channels. Depending on channel coding, the data transmission rate of a single traffic channel may vary between 2.4 and 7.2 kbit/s, and by allocating all channels of one frame to a single data transmission connection, a maximum rate of 28.8 kbit/s is achieved. Assignment of speech items between terminals and base stations is controlled by a Switching and Management Infrastructure SwMI comprising digital exchanges DXT to which the terminals are connected. Companies and official organizations may reserve channels from the TETRA infrastructure for their use, in which case the area-based reservation of the channels is typically restricted to the operating range of the organization.

A group call is one of the main functions of a PMR network. In addition to their own subscriber numbers, in the PMR network subscribers are provided with group numbers to indicate the group call group or subscriber group the subscriber belongs to, which enables calls intended for all subscribers in the group to be transmitted to the subscribers in the group. The group call is used e.g. when several participants are involved in an event, and particularly when the entire group continually needs to know the current situation. The group call is a conference call wherein all participants may take turns at speaking, i.e. be provided with speech items, and listening to each other. The system makes sure that only one participant may speak at a time. The subscriber may belong to several group call groups or subscriber groups whose group calls the subscriber can monitor simultaneously and switch a group call with a desired priority, or a group call with the highest priority as far as the subscriber is concerned, to be received. In the group calls, the entire group is called by using a single call number. As to the radio path, the group call can be implemented in a simplex form as a point-to-multipoint call wherein speech at a given time travels from one speaker to several receivers and the speech item is assigned to a next speaker according to a predetermined practice. Another typical way to implement a group call is a semi-duplex call wherein the speakers request speech items e.g. by pressing a particular switch. A call may comprise one or more speech items, or the speech items may be sequential. Naturally, it is also feasible to implement the group call as a duplex call wherein all participants are allowed to speak simultaneously.

In public radio telephone networks, such as a Global System for Mobile Communication GSM system, all calls are typically provided with the same priority, i.e. no user is given priority over any other user. In the private radio networks, i.e. the PMR networks, the operation of the network can be controlled such that users carrying out special e.g. emergency-related maintenance tasks or other such important tasks are provided with higher priority, i.e. their high-priority call will be switched first in a high-volume traffic situation. An example of a high-priority call is an emergency call, which refers to a call wherein at least one subscriber is in distress. The subscriber in distress can activate the emergency call, or it can be activated by another subscriber station or dispatcher monitoring the operation. When necessary, the emergency call can interrupt other calls in order to obtain the speech channel it needs.

A problem with the arrangement described above is the limited coverage of the mobile communication networks, such as the PMR networks, or the geographical area reserved therefrom for the use of an organization, and, on the other hand, the incompatibility of the terminals of a particular mobile communication system, such as PMR terminals, with other telecommunication systems. On many occasions, however, a terminal should establish a connection to its own network from outside the coverage area of the network, e.g. a PMR terminal should participate in a group call while being located outside the coverage area of the PMR network. In such a case, the PMR terminal is typically located in the coverage area of another wireless telecommunication network, such as the GSM network, but the incompatibility of the PMR terminal with the GSM will not allow a connection to be established to the PMR system. In addition, managing the group call essential to the PMR system in public mobile communication networks differs considerably from managing the group call in the PMR networks, which means that participating in a PMR group call by using a connection established through another system would require drastic changes in the standardization of the public mobile communication networks. A further drawback of the PMR networks is the rather low data transmission rate e.g. when video image from a site of an accident is to be transmitted in an official network. The video image could be transmitted through another, more broadband network but this is impossible due to the incompatibility problems.

Publication WO 99/48312 describes an arrangement wherein a terminal in a wireless telecommunication network is able to establish a data transmission connection to said telecommunication network both wirelessly through a radio interface specified for said telecommunication network and through a wired connection using an Internet Protocol IP. Existing wired public telecommunication connections, such as the Internet, and private connections, such as company local area networks, can thus be utilized for efficient data transmission between wireless terminals, thus extending the coverage area of the wireless telecommunication network everywhere an Internet connection can be established. The connection of the terminal to an IP network and therethrough to the wireless telecommunication network is established through a particular base station emulator PBU, which arranges messages according to the wireless telecommunication network protocol into IP data packets, which are decompressed at the other end of the IP connection into messages according to the wireless telecommunication network protocol before being transmitted to said wireless telecommunication network. The problem with the arrangement is, however, that the implementation is tied up with the wireless telecommunication system and the transmission of the messages according to the protocol used therein on top of the IP protocol. Thus, the arrangement does not enable a shared use of terminals which belong to different telecommunication systems. A further problem is the required connection establishment to the base station emulator, which considerably restricts the number of potential connection setup points.

BRIEF DESCRIPTION OF THE INVENTION

An object of the invention is thus to provide a method and an apparatus implementing the method so as to enable drawbacks caused by the above-mentioned problems to be alleviated. The invention relates to a method of routing calls in a telecommunication system comprising a mobile communication system comprising at least one mobile services switching centre and at least one base station connected thereto, and mobile stations wherefrom a telecommunication connection is established to the mobile services switching centre through the base station by using a first predetermined signalling protocol on a radio connection, a packet data network wherein data to be transmitted is transmitted in data packets, according to a protocol specified for the packet data network, a server communicating with the mobile services switching centre and said packet data network, and at least one terminal wherefrom a telecommunication connection is established through the packet data network and the server to the mobile switching centre.

The method of the invention is characterized by arranging, in said server, messages according to the first signalling protocol supplied from the mobile services switching centre as such into data packets according to said packet data network protocol to be forwarded through said packet data network, and decompressing, in the server, messages according to the first signalling protocol arranged as such into the data packets according to said packet data network protocol and supplied from the packet data network to be forwarded to the mobile switching centre, and transmitting and receiving by said terminal the messages according to the first signalling protocol arranged as such into the data packets according to said packet data network protocol, and emulating a mobile station using said first signalling protocol by the terminal.

The invention further relates to a telecommunication system for routing calls, the system comprising a mobile communication system comprising at least one mobile services switching centre and at least one base station connected thereto, and mobile stations arranged to establish a telecommunication connection to the mobile services switching centre through the base station by using a first predetermined signalling protocol on a radio connection, a packet data network wherein data to be transmitted is arranged to be transmitted in data packets, according to a protocol specified for the packet data network, a server communicating with the mobile services switching centre and said packet data network, and at least one terminal arranged to establish a telecommunication connection through the packet data network and the server to the mobile switching centre.

The telecommunication system of the invention is characterized in that said server is arranged to arrange messages according to the first signalling protocol supplied from the mobile services switching centre as such into data packets according to said packet data network protocol to be forwarded through said packet data network, and the server is further arranged to decompress messages according to the first signalling protocol arranged as such in the data packets according to said packet data network protocol and supplied from the packet data network to be forwarded to the mobile switching centre, and said terminal is arranged to transmit and receive the messages according to the first signalling protocol arranged as such into the data packets according to said packet data network protocol, and the terminal is further arranged to emulate a mobile station using said first signalling protocol.

The invention further relates to a server arranged to establish a telecommunication connection to a mobile communication system and a terminal communicating with a packet data network, the mobile communication system being arranged to use a first predetermined signalling protocol, and data transmitted in the packet data network being arranged to be transmitted in data packets, according to a protocol specified for the packet data network.

The server is characterized in being arranged to arrange messages according to the first signalling protocol supplied from the mobile communication system and arranged as such into data packets according to said packet data network protocol to be forwarded through said packet data network to the terminal, the server being further arranged to decompress messages according to the first signalling protocol arranged as such in the data packets according to said packet data network protocol and supplied from the terminal through the packet data network to be forwarded to the mobile communication system.

The invention further relates to a terminal of a telecommunication system, the terminal being arranged to establish a telecommunication connection through a packet data network and a server to a mobile communication system arranged to use a first predetermined signalling protocol, data transmitted in the packet data network being arranged to be transmitted in data packets, according to a protocol specified for the packet data network.

The terminal is characterized in being arranged to transmit and receive messages according to the first signalling protocol arranged as such into data packets according to said packet data network protocol, and to emulate a mobile station using the first signalling protocol.

Preferred embodiments of the invention are disclosed in the dependent claims.

The idea underlying the invention is that a terminal located outside the coverage area of a mobile communication system establishes a telecommunication connection to said mobile communication system through a packet data network and a server connecting the two. The terminal is arranged to establish a telecommunication connection to the packet data network, and a different signalling protocol can be used on this telecommunication connection from that used in said mobile communication system. Data transmission between the terminal and the mobile communication system takes place according to a packet data network protocol such that speech frames and data frames as well as signalling according to said mobile communication system are arranged as such into data packets according to the packet data network protocol in the server located between the mobile communication system and the packet data network. Correspondingly, messages according to the mobile communication system arranged as such into the data packets according to the packet data network protocol and supplied from the packet data network to be forwarded to the mobile communication system are decompressed in the server. The terminal is arranged to emulate a mobile station according to the mobile communication system and to transmit and receive the messages according to the mobile communication system arranged as such into the data packets according to the packet data network protocol.

An advantage of the method and system of the invention is that by changing the protocol conversion between the packet data network protocol and the protocol according to the mobile communication system to be carried out in the terminal capable of emulating the mobile station according to the mobile communication system, the theoretical coverage area and number of access points of said mobile communication system can be increased considerably. A further advantage is that a terminal according to another wireless telecommunication system which is, according to the invention, arranged to emulate a mobile station of a particular mobile communication system, is able to participate in the data transmission taking place in said mobile communication system. A still further advantage is that when the emulation of the mobile communication system is arranged to be carried out in the terminal, a connection setup point to the packet data network can be freely chosen irrespective of a base station emulator. A further advantage is that the invention enables participation in a group call according to e.g. the PMR system from outside the coverage area of the PMR system. A further advantage is that data requiring a broadband data transmission path, such as video image, can be transmitted e.g. to the PMR system. A further advantage is that the procedure of the invention requires no changes in the standards but the invention can be implemented by utilizing solutions according to said server and said terminal.

BRIEF DESCRIPTION OF THE INVENTION

Figure 2:
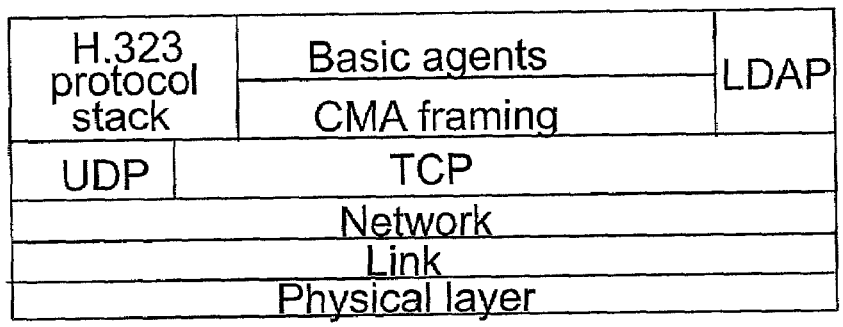
Figure 3:
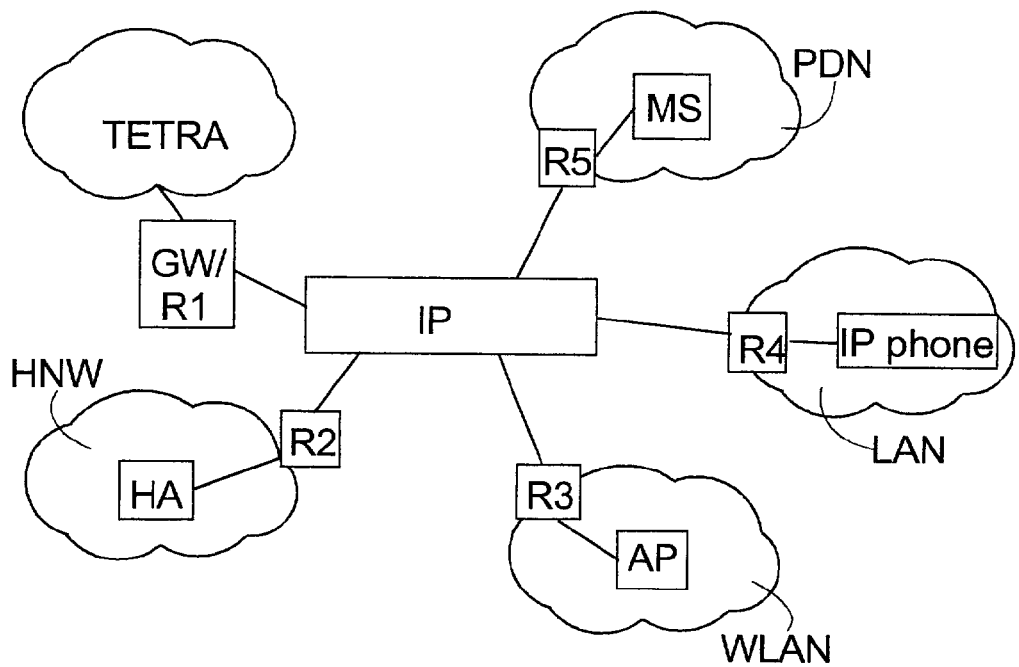
Figure 4:
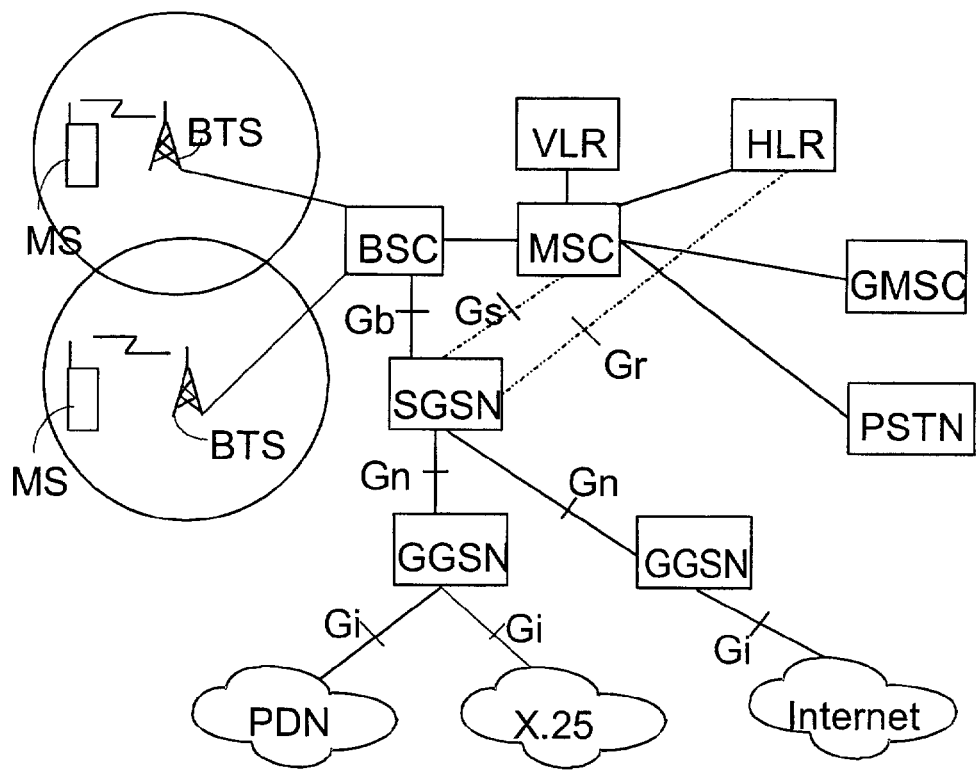
Figure 5:
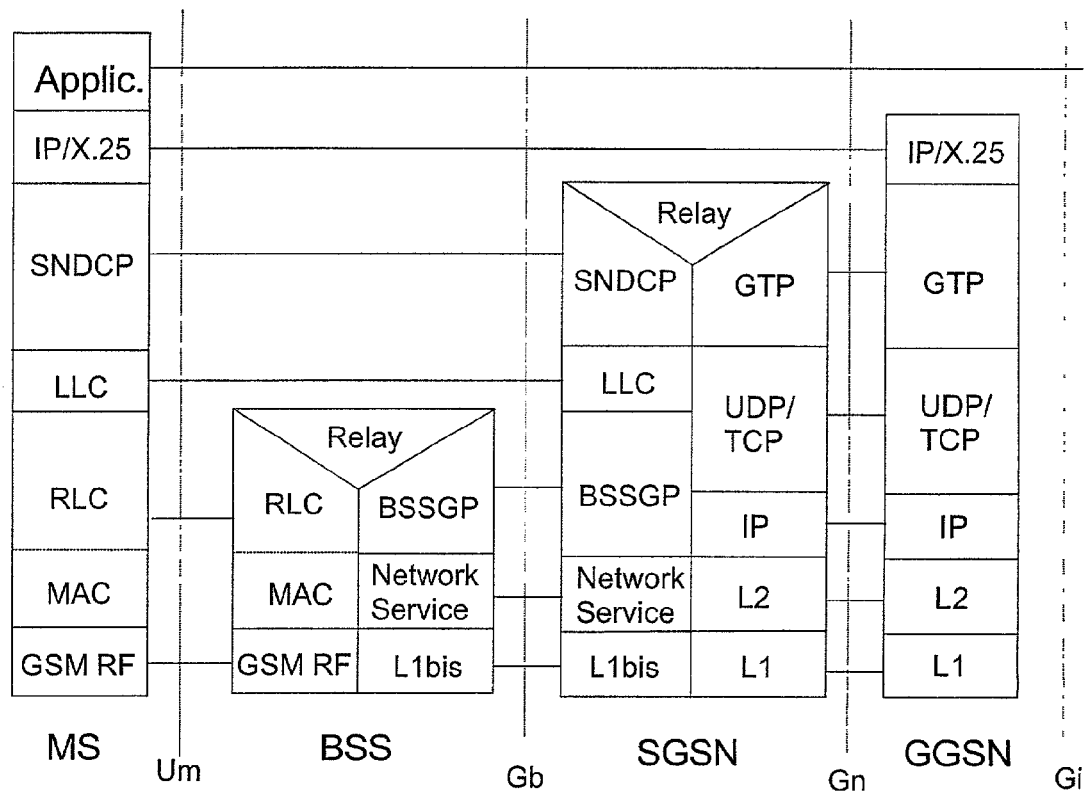
Figure 6:
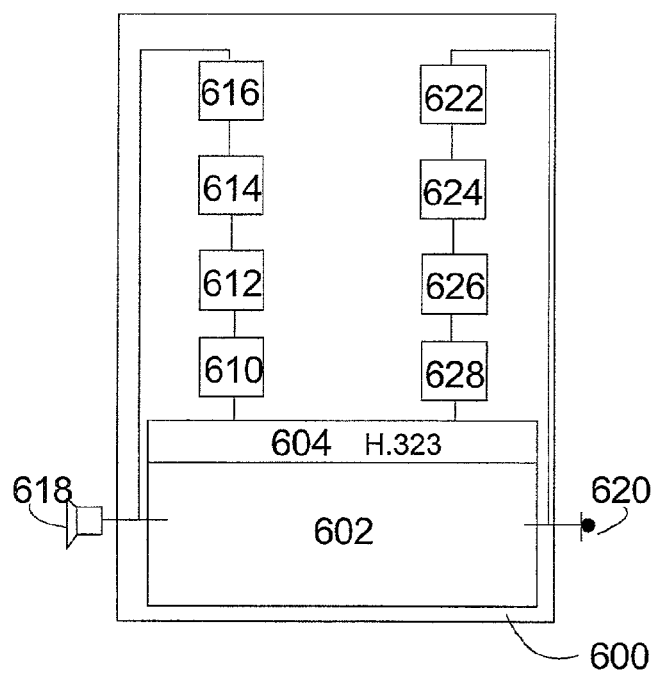

The invention is now described in closer detail in connection with the preferred embodiments and with reference to the accompanying drawings, in which FIG. 1 is a block diagram showing a telecommunication network architecture of the invention, FIG. 2 shows a protocol stack of a VoIP standard, FIG. 3 is a block diagram showing a telecommunication network architecture of the invention using a Mobile IP protocol, FIG. 4 is a block diagram showing the structure of a General Packet Radio Service GPRS developed for a GSM mobile communication network, FIG. 5 shows a data transmission connection between a mobile station MS and an external IP network by means of protocol layers of a GPRS system, and FIG. 6 is a block diagram showing the structure of a terminal according to the invention.

DETAILED DESCRIPTION OF THE INVENTION

FIG. 1 shows in a simplified manner a telecommunication network architecture whereto the invention can be applied. A TETRA network is described by a simplified block diagram wherein TETRA terminals Tms 1 and Tms 2 communicate with a TETRA Base Station TBS over a radio path. The base stations TBS further communicate with an exchange DXT of the TETRA network. The exchanges DXT and the base stations TBS connected thereto form a switching and management infrastructure SwMI, which controls the assignment of speech items between calls. The switching and management infrastructure SwMI may typically comprise several exchanges DXT, several base stations TBS being typically connected to a single exchange. Furthermore, one or more dispatcher workstations DWS, which are also able to establish a connection to the terminals and manage and control calls of single subscribers and groups, are typically connected to the switching and management infrastructure. From the switching and management infrastructure, or, to be more precise, from an exchange DXT therein, a further connection is arranged to a Public Switched Telephone Network/Integrated Services Digital Network PSTN/ISDN, through which the TETRA terminal can establish a further connection to the wired network telephone or e.g. a GSM telephone.

In accordance with the invention, a Gateway Server GW, from which a further connection is arranged to an Internet Protocol IP based network, is connected to the mobile communication system, i.e. in the present example to the TETRA system, preferably in connection with an exchange DXT in the switching and management infrastructure SwMi. The gateway server GW is responsible for converting the speech and data traffic according to the TETRA protocol into a form to be transmitted by using the IP protocol. This can be implemented by using e.g. an H.323 protocol, which is a standard specified by the International Telecommunication Union ITU for compressing voice and video image used in video conference programs and for call control. The protocol conversion carried out by the gateway server GW preferably takes place such that the signalling according to the TETRA protocol and the frame structures of speech and data are converted as such into an H.323 form. The protocol conversion thus applies to all communication according to the TETRA system, thus including e.g. packet data applications, short messages and status information on the terminals according to the TETRA system. Encryption carried out in the TETRA system is not decrypted but the encrypted frames are placed as such into H.323 frames. Neither does speech speech-encoded in the TETRA system have to be decoded before the speech frames are placed into the H.323 frames, which means that transcoding, which degrades the quality of speech, is avoided. Consequently, in the IP-based network, packet-switched traffic according to the H.323 protocol can be transmitted to the terminal MS connected to the network, and the terminal, according to the invention, reconverts the packet-switched traffic according to the H.323 protocol transmitted as IP packets into speech and data traffic and signalling according to the TETRA protocol.

The terminal MS does not preferably have to be a TETRA system terminal but it may be any terminal capable of establishing an IP-based connection, such as a terminal supporting a General Packet Radio Service GPRS designed for the GSM system. The essential point of the terminal MS of the example is that it is capable of emulating a TETRA terminal, i.e. it is capable of decoding the received speech and data according to the TETRA system, operating as required by the signalling according to the TETRA system and, correspondingly, encoding the speech and data to be transmitted into a form required by the TETRA protocol, and using the signalling according to the TETRA protocol.

The gateway server GW is responsible for the protocol conversion for converting the typically circuit-switched data transmission of the TETRA protocol to the IP-based packet traffic. The gateway server GW also establishes and terminates calls both towards the TETRA system and the IP connection. In addition, the gateway server GW attends to several tasks associated with mobility and call management. The gateway server GW authenticates terminals being connected to the system, in which connection the requirements for using the TETRA encryption on a connection between the terminals are specified, and a separate encryption for the IP data transmission connection used can also be agreed upon. Furthermore, the gateway server GW maintains information on IP addresses of the terminals and attends to up-dating the address information in connection with different updating signallings associated with the mobility management. The gateway server maintains information on calls passing therethrough, simultaneously collecting call statistics. The above-mentioned address information and the updates thereof as well as the call information can preferably be stored in a database located in connection with the server GW. The above-mentioned functionalities of the gateway server GW have been described as a single, integrated server unit, but as far as the invention is concerned, the same functionalities can be distributed among several servers. For example, authentication and agreement about encryption can be carried out by a separate, dedicated authentication server.

As its data transmission protocol the Internet uses a Transmission Control Protocol/Internet Protocol TCP/IP, whose particular advantage is its independence of different equipment and software architectures. In Internet-based networks, the IP protocol is the actual network protocol responsible for routing an IP message equipped with an address from a source station to a target station. A transport protocol, which can either be the TCP or a User Datagram Protocol UDP, is run on top of the IP network protocol. The transport protocol is responsible for transferring the data packets from a source address to a target address. The TCP provides applications with reliable connections, i.e. the TCP divides the data supplied from the applications into IP packets, ensures that the data reaches its destination intact and in a correct order, retransmits lost and damaged data packets and also attends to flow control. The UDP, in turn, is a lighter transfer protocol than the TCP, which does not ensure the correctness of the data packets, nor that the data packets reach their destination. The UDP is thus an unreliable transport protocol, which leaves the application program to answer for error and correctness checking, being, however, more suitable for services requiring real-time procedures.

Being common, Internet-based networks enable low-cost, in local area networks even free, data transmission; these properties have aroused interest in also transmitting voice calls through the IP networks. The data transmission between exchanges of different telecommunication systems could then also be carried out by the IP networks. Existing equipment and system solutions for transmitting conventionally circuit-switched voice calls in a packet-switched IP network have been rather unreliable and incompatible with each other. A standard called Voice over IP VoIP is being established for making "Internet call systems" compatible, which specifies e.g. compatibility of equipment, service quality and call routing in the IP networks.

FIG. 2 shows a VoIP standard recommendation for a protocol stack of the Internet call systems. Depending on the application, either the TCP or UCP is run on top of the IP network protocol. The next layer comprises an H.323 protocol stack, which is used for call setup and compatibility negotiations as well as for reserving a connection from the IP network required by real-time speech. Call management and the related functions and services, such as e.g. selection of transmission protocol, potential speech coding, Voice Activity Detection VAD and DTMF functions, are carried out in a Call Management Agent System CMAS unit, which comprises a CMA framing part and basic agents for each function. The CMAS utilizes a Lightweight Directory Access Protocol LDAP, which is used for conducting a telecommunication name service between various networks and file servers without the transport protocol having to answer for it. An external telephone network, e.g. a private network according to the TETRA system, is connected to the VoIP system by the gateway server GW, which supports the H.323 protocol.

By connecting the above-described arrangement to cooperate with a protocol managing the mobility of the IP addresses, a user of the terminal of the invention can be enabled to operate anywhere in the TETRA network, including outside the coverage area of the TETRA system, provided that a connection can be established to the IP-based system. A protocol provided particularly for managing the mobility of the IP addresses of mobile communication networks is known as an Address Information Protocol AIP. In an arrangement according to the AIP, at least one exchange in the mobile communication network is arranged to serve as a gateway router between the mobile communication system and the external data network. An IP address, which is bound to the identity information on the user and the mobile station and maintained by the exchanges in the mobile communication system as well as to the location information on the mobile station, is allocated either permanently or temporarily to each mobile station. The above-mentioned information is independent of the IP network, so on the basis of the location information, the exchange operating as the gateway router is able to route data packets equipped with an IP address further to a corresponding mobile switching centre, which compares the IP address with the identity information on the user and the mobile station, on the basis of which the data packets will be delivered to a correct mobile station.

Another protocol which manages the mobility of the IP addresses and which can be utilized in connection with the present invention is known as a Mobile IP. A Home Network HNW of a terminal moving in accordance with a mobile IP arrangement, i.e. any telecommunication network wherein a terminal is provided with a permanent IP address, comprises a Home Agent HA operating at a server and being responsible for the mobility management of the terminal. When the terminal moves outside the home network HNW, the home agent HA updates address information on the terminal and routes the data packets supplied to the terminal further to the current address of the terminal. Since the home agent HA of the home network is responsible for routing the IP packets outside the TETRA network, for the TETRA network the terminal seems to be located in its own home network all the time. For a more detailed description of the mobile IP protocol, reference is made to an Internet Engineering Task Force IETF document called *Request for Comments (RCF)* 2002.

FIG. 3 illustrates the above-described arrangement wherein the TETRA network is connected to the IP network through the gateway server GW and a router R1. The router R1 may preferably be integrated into the gateway server GW. Several subscriber networks, such as the home network HNW of a moving terminal, wireless local area network WLAN, wireless packet data network PDN connected to e.g. a mobile communication network, and a wired local area network LAN, which are preferably based on different technologies and support the mobility of the terminal, are further connected to the IP network through routers R2 to R5. The moving terminals in each network can further establish an IP-based connection to other networks through the Internet access points in each network.

In the following, the data transmission between the TETRA network and the external network according to the present invention will be described in closer detail based on the General Packet Radio Service GPRS developed for the GSM mobile communication network and with reference to FIG. 4. It is obvious that the implementation of the invention in the GPRS system is only shown as a single example of the preferred embodiments of the invention and that the invention can also be implemented in any other corresponding system.

The GPRS is a packet radio network which utilizes the GSM network and which, by utilizing the protocol layers in the GPRS, aims to optimize the transfer of data packets on an air interface between the mobile station and the GPRS network. A network operator and a mobile subscriber may agree on a data rate used between 9.6 to 171.2 kbps. FIG. 4 illustrates how the GPRS system is built on the GSM system. The GSM system comprises Mobile Stations MS connected over a radio path to Base Transceiver Stations BTS. Several base transceiver stations BTS are connected to a Base Station Controller BSC, which controls the radio frequencies and channels used by the base transceiver stations BTS. The base station controller BSC and the base transceiver stations BTS connected thereto form a Base Station Subsystem BSS. The base station controllers BSC are, in turn, connected to a Mobile Services Switching Centre MSC, which is responsible for connection setup and routing calls to correct addresses. For this purpose, two databases are utilized which comprise information on mobile subscribers: a Home Location Register HLR comprising information on all subscribers in the mobile communication network and the services they subscribe to, and a Visitor Location Register VLR comprising information on mobile stations visiting the area of a particular mobile services switching centre MSC. The mobile services switching centre MSC is, in turn, connected to other mobile services switching centres through a Gateway Mobile Services Switching Centre GMSC and to a Public Switched Telephone Network PSTN. For a more detailed description of the GSM system, reference is made to ETSI/GSM specifications and *The GSM System for Mobile Communications*, M. Mouly and M. Pautet, Palaiseau, France, 1992, ISBN:2-957190-07-7.

The GPRS system connected to the GSM network comprises two almost independent functions called a Gateway GPRS Support Node GGSN and a Serving GPRS Support Node SGSN. The GPRS network may comprise several gateway nodes GGSN and serving nodes SGSN, several gateway nodes GGSN typically being connected to a single serving node SGSN. Both nodes SGSN and GGSN operate as routers which support the mobility of the mobile station and which are responsible for controlling the mobile communication system and routing data packets to the mobile stations regardless of their location and the protocol used. The serving node SGSN is connected to the mobile station through the mobile communication network. A connection to the mobile communication network (interface Gb) is typically established either through the base transceiver station BTS or the base station controller BSC. The serving node SGSN is responsible for detecting mobile stations capable of GPRS connections in its service area, transmitting and receiving data packets from said mobile stations and monitoring the location of the mobile stations in its service area. Furthermore, the serving node SGSN communicates with the mobile services switching centre MSC, and with the visitor location register VLR through a signalling interface Gs and with the home location register HLR through an interface Gr. In the home location register HLR is also stored GPRS records, which comprise the contents of subscriber-specific packet data protocols.

The gateway node GGSN serves as a gateway between the GPRS network and an external Packet Data Network PDN. External packet data networks may include e.g. the Internet, X.25 network or a private local area network. The gateway node GGSN communicates with the data networks through an interface Gi. The data packets transmitted between the gateway node GGSN and the serving node SGSN are encapsulated according to the GPRS standard. The gateway node GGSN also comprises Packet Data Protocol PDP addresses and routing information, i.e. SGSN addresses, of the GPRS mobile stations. The routing information is thus used for linking the data packets between the external packet data network and the serving node SGSN. The GPRS backbone network between the gateway node GGSN and the serving node SGSN is a network using an IP protocol, preferably an Internet Protocol, version 6 Ipv6 protocol.

When the user of the mobile station MS of the invention is to establish a connection to the TETRA network, the mobile station MS transmits an attachment message (GPRS attach) to the GPRS network and simultaneously tries to activate the routing connection (PDP context activation) of the gateway server GW of the TETRA network, i.e. to establish a logical link to the gateway node GGSN of the GPRS network transmitting the functions of the gateway server GW of the TETRA network. The data transmission connection between the mobile station MS and the gateway server GW of the TETRA network is described by the protocol layers of the GPRS system according to FIG. 5. The data transmission between the mobile station MS and the base station subsystem BSS of the GSM network over a radio interface Um takes place according to the common GSM protocol. On an interface Gb between the base station sub-system BSS and the serving node SGSN, the lowest protocol layer has been left open and either an ATM or Frame Relay protocol is used on the second layer. A BSSGP layer on top of this layer adds routing and service quality specifications as well as signalling associated with data packet acknowledgement and Gb interface management to the data packets to be transmitted.

The direct communication between the mobile station MS and the serving node SGSN is specified in two protocol layers called a SubNetwork Dependent Convergence Protocol SNDCP and a Logical Link Layer LLC. The user data transmitted on the SNDCP layer is segmented into one or more SNDC data units and the user data and the related TCP/IP header field can be compressed, after which the SNDC data units can be encrypted. The SNDC data units are transmitted in LLC frames whereto address and checking information relevant to the data transmission has been added. The LLC layer is responsible for maintaining the data transmission connection between the mobile station MS and the serving node SGSN and for retransmitting damaged frames. The serving node SGSN answers for further routing the data packets supplied from the mobile station MS to a correct gateway node GGSN. This connection utilizes a GPRS Tunnelling Protocol GTP, which encapsulates and tunnels all user data and signalling transmitted through the GPRS backbone network. The GTP protocol is run on top of the IP used by the backbone network.

The above-described arrangement operates as a data transmission path for the IP-based packet traffic between the mobile station MS and the gateway node GGSN, which enables the procedure of the invention for transmitting application-specific packet data independent of the physical data transmission path between the mobile station MS and the external IP network. For the external IP network, the gateway node GGSN operates as an IP router which is independent of the protocol layers below the IP. In the arrangement of the invention, the application run on top of the IP is preferably an application according to the VoIP protocol. It is to be noted that the GPRS system utilizes two IP layers which are independent of each other and which do not intercommunicate: the first on the GPRS backbone network level between the serving node SGSN and the gateway node GGSN, and the second on the user level between the mobile station MS and the gateway node GGSN.

FIG. 6 generally describes the structure of a terminal of the invention. The terminal is typically a terminal of another wireless telecommunication system, such as the GSM-based GPRS system, for example. The terminal may also be a Universal Mobile Telecommunication System UMTS terminal or a GSM terminal supporting data calls, a terminal of a wireless local area network (e.g. according to the IEEE 802.11 standard), or a terminal in a satellite telephone system. The essential point of the wireless terminal of the invention is that it is capable of transmitting IP-based data traffic and that the telecommunication system at issue is responsible for the mobility management of the terminal such that the gateway server GW of the TETRA system is aware of the IP address used at a given time whereto the traffic directed to the terminal should be directed. The terminal may also be a terminal of a wired network, such as a dispatcher workstation DWS connected to a wired local network. The terminal is then typically provided with a fixed IP address, which means that mobility management can be ignored.

According to FIG. 6, in addition to functionalities 602 of a terminal of a telecommunication system known per se, such as a GSM terminal supporting the GPRS, a terminal 600 of the invention comprises at least signal generating means 604 for performing call control signalling according to the H.323 protocol, means 610 for decompressing TETRA speech frames and signalling messages in IP data packets, means 612 for decrypting the TETRA encryption in the received TETRA frames, means 614 for block deinterleaving and unmixing the decrypted TETRA frames, decoding means 616 for decoding channel and speech coding, from which decoding means speech is forwarded to a loudspeaker 618 of the terminal. The terminal 600 of the invention further comprises a microphone 620, and the speech received therefrom is supplied to encoding means 622 in order to perform speech and channel coding according to the TETRA system. Interleaving and mixing means 624 perform block interleaving and mixing on the channel-coded TETRA frames, and encoding means 626 further perform encryption according to the TETRA system, after which the encrypted frames are supplied to the IP data packets in means 628 to be forwarded to the gateway server GW of the TETRA network over the IP connection on top of the physical connection established by the terminal. The protocol conversion performed in the terminal, wherein the TETRA information is arranged into the IP data packets or decompressed from the IP data packets, thus applies to all communication according to the TETRA system, thus including e.g. packet data applications, short messages and status information on the terminals according to the TETRA system.

In the case of the wireless terminal, in the terminal of the invention many functionally similar procedures to those e.g. in the GSM terminal are performed on the frames according to the TETRA system. When applicable, in the wireless terminals 600 of the invention it is thus possible to utilize the functionalities 602 of the terminal according to the telecommunication system known per se. The technology now being developed can then preferably be utilized, whereby single digital signal processing means and programmable means can be used for speech and channel coding and decoding as well as system-specific block interleaving, encryption or other such procedures and the inverse functions thereof of several different telecommunication systems. Advanced technology is also increasingly being applied to radio frequency blocks of the wireless terminals, so in the future it will be possible to use a terminal equipped with a single radio frequency element in several different telecommunication systems. The above-described technology is called a software SW radio.

Hence, by applying the SW radio, the procedures of blocks 610 to 616 and 622 to 628 can be carried out in the terminal 600 of the invention by the same means as used by the terminal for establishing the physical connection used below the IP connection. Furthermore, the loudspeaker 618 and the microphone 620 already provided in the terminal can be utilized. If the SW radio technology is used for implementing the terminal, the terminal of the invention can thus be preferably implemented in connection with the terminal of the telecommunication system known per se simply by changes in the software. The SW radio technology also enables the software changes to be downloaded to the terminal from a server in a network through a wired or wireless connection. The terminal may be e.g. a terminal known per se which supports the GSM/GPRS protocol and which is to be temporarily used e.g. as a TETRA terminal. A necessary software package, which can preferably be decompressed in the terminal and which performs the necessary software changes on different blocks is then downloaded from the network into the memory in the terminal. Naturally, the functionalities of the invention can also be built as separate ones in the terminal.

In the above example, the terminal of the invention has been described from the point of view of a connection to be established to the TETRA system. It is obvious to one skilled in the art that according to the invention, the connection can be established between any two terminals belonging to different telecommunication systems.

In the following, the invention will be further illustrated by using a preferred embodiment of the invention. In the TETRA system, an embodiment of the invention is to connect a terminal external to the TETRA system to a group call. The group call can be established by either a terminal of a wired network connected to the network, such as a dispatcher workstation DWS, or a wireless terminal. Members in the group are provided with a common group call number and only terminals activated into the group can participate in the group call. Accepted by an authorized user or controller, the terminals can be activated into the group either permanently or they can be connected to the group dynamically during the group call or when the group call is being set up.

Correspondingly, the terminal of the invention can be activated into a group. The gateway server GW then connects the terminal to the group by establishing a connection to the IP address of the terminal, whereby the necessary group call numbers, i.e. group identities, to be stored in the memory of the terminal are transmitted to the terminal at the same time. The group call numbers specify the groups formed by different terminals with whom the terminal can establish a group call. The terminal of the invention may be connected to participate in the group call or it can itself initiate group call setup. The gateway server GW connects the terminal to the group call e.g. by H.323 signalling to the IP address of the terminal. Correspondingly, the terminal itself may initiate a group call by establishing an IP connection to the gateway server GW through e.g. the GPRS network as described above. The gateway server GW either compresses the TETRA frames directed to the terminal into IP packets or decompresses the TETRA frames from the IP packets supplied from the terminal and forwards them to the switching and management infrastructure SwMI. As far as the group call management and the switching and management infrastructure SwMI are concerned, the essential point is that the data transmission directed to and supplied from the terminal takes place through the gateway server GW, i.e. through one address, in the form required by the TETRA system.

The terminal may also preferably be authenticated during the connection setup between the terminal and the gateway server GW. An authentication centre of the telecommunication system used by the terminal, such as the GSM used in the GPRS, can preferably be utilized for this purpose. In such a case, a tunnelled connection may preferably be established either from an authentication function in the gateway server GW or a separate authentication server to said authentication centre, which checks the identification information on the terminal and compares it with the information in the authentication function of the gateway server on the terminals that are allowed connection establishment. The terminal should also know the IP address of the gateway server or the authentication server in order to be able to transmit messages necessary for the authentication thereto.

The group call is typically implemented as a semi-duplex call wherein a speech item is requested by pressing a speech switch, i.e. a Press-To-Talk PTT button. In the terminal of the invention, a logical PTT button is preferably specified, which can be one of the keys of the user interface typically provided in the terminal. When participating in a TETRA call, the terminal is programmed such that a speech item request is transmitted to the TETRA network in response to a particular press of a key. The speech item requests can preferably be transmitted e.g. as a short message, WAP message or other such fast signalling, since the signalling carried out through the IP connection may cause too long a delay for the TETRA system. If a desired group comprises no other speech item requests or other such activity, the switching and management infrastructure SwMI gives the terminal a speech item, establishes a connection to the other terminals in the group and transmits the identity of the terminal to which the speech item was given to the terminals. When the PTT button is released from a terminal that has used its speech item, the issued speech item is disconnected, after which a next speech item can be given according to established priorities to another member in the group.

If several members in the group participate in the group call through the IP connection, a multicast property of the TETRA system may be used in the gateway server GW, in which case towards the switching and management infrastructure SwMI the gateway server GW operates as a base transceiver station multiplexing the transmission of several terminals on the same radio channel, whereas towards the terminals on the IP connection it establishes a point-to-multipoint call. The gateway server GW maintains IP address information on the terminals participating in the group call and information about the physical transmission path used on each IP connection, the information comprising various information associated with the mobility management of the terminals.

Typically, a group call can be disconnected by the owner of the group call only, who typically is the initiator of the call, or by a supervising dispatcher through his or her workstation DWS.

The initiator of the group call may hand over the management of the call to another terminal participating in the call. A single terminal may exit the group call by transmitting a message indicating the exit to the switching and management infrastructure SwMI. Problems caused by disconnecting the physical connection used below the IP connection can be avoided such that the gateway server GW or the switching and management infrastructure SwMI checks the operation of the terminal at predetermined intervals through the gateway server GW, and the terminal is expected to acknowledge the checking. If no acknowledgement is received, the terminal is removed from a list of terminals participating in the group call after a time limit, and the connection is disconnected and the information associated with the terminal is removed from the gateway server GW.

Terminals of the TETRA system are typically also capable of establishing a direct call connection called a Direct Mode Operation DMO between the terminals without the call being routed via a network. In addition, the TETRA system is familiar with an "express call" wherein a point-to-point or a group call connection is established through the network immediately in response to a press of a PTT button in the terminal making the call. The express call may also be implemented as an arrangement according to the invention, whereby a logical PTT button is specified in the terminal also for the express call, and in response to a press of the PTT button, a speech item request is transmitted to the TETRA network. The speech item requests may preferably be transmitted as fast signalling as described above, which enables a potential long delay caused by the IP connection to be avoided.

The group call may also be implemented as a duplex call. In such a case in particular, an embodiment of the invention is relevant wherein through the IP connection and the gateway server GW the terminal is able to communicate simultaneously with several terminals belonging to different systems. The requirement is that the terminals are terminals according to the invention which are capable of transmitting IP-based data traffic, filtering frames according to the TETRA system from the received IP data packets and, correspondingly, attaching the TETRA frames to be transmitted to the IP data packets, as well as operating also as a TETRA terminal according to the information in the frames. The gateway server GW is responsible for routing the TETRA frames attached to the IP data packets to different terminals and selecting a correct physical transmission path for the IP traffic to be transmitted to each terminal. The TETRA traffic transmitted is thus independent of the physical transmission path, and the gateway server GW and the switching and management infrastructure SwMI of the TETRA are responsible for transmitting the terminal-specific TETRA frames. This naturally applies to the simplex and semi-duplex group calls as well.

According to a preferred embodiment of the invention, the terminal can also participate in several group calls simultaneously through the IP connection and the gateway server GW. The group identities transmitted to the terminal specify a priority for each group call on the basis of which the order of participation in each group call is chosen. Both the terminal and the gateway server GW then arrange the group call frames to be transmitted into the IP packets according to said priorities.

According to a preferred embodiment of the invention, the procedure of the invention can also be utilized when a more broadband transmission path is needed. The radio interface of the TETRA system is mainly designed for speech transmission, so it is specified to be quite narrowband. In special situations, all four time slots of the TDMA frame can be allocated to one call, which means that the data transmission rate is 28.8 kbit/s at most. Such a rate is not, however, enough for transmitting e.g. video image, which might sometimes be useful e.g. in official networks. In such a case, the terminal of the invention, which is arranged to operate e.g. in the GPRS system, can be used for transmitting video data attached to the IP data packets at a sufficiently high rate to the TETRA system e.g. to a dispatcher workstation DWS to be further displayed. Correspondingly, e.g. video image can also be transmitted from the TETRA system to the terminal by utilizing the procedure described above. A corresponding procedure can be used in connection with any data transfer requiring a large bandwidth, or if large data files are to be transmitted to or from the terminal at a high speed.

It is to be noted that the packet data network used in the arrangement of the invention has been described above only as seen from the point of view of an IP-based network. The invention is not, however, restricted only to the IP networks but a corresponding protocol conversion can be carried out in any other corresponding packet data network. Instead of the IP network, packet networks based e.g. on frame relay or ATM protocols can thus be used.

In the above examples, the invention has been described in connection with the TETRA system because the invention is particularly advantageous in implementing a group call according to the TETRA system. It is obvious to one skilled in the art, however, that the invention can also be applied to other mobile communication systems and that as technology advances, the basic idea of the invention can be implemented in many different ways. The invention and its embodiments are thus not restricted to the examples described above but they can vary within the scope of the claims.

The invention claimed is:

1. A method of routing calls in a telecommunication system comprising:
    a mobile communication system comprising at least one mobile services switching center and at least one base station connected thereto, and mobile stations wherefrom a telecommunication connection is established to the mobile services switching center through the base station by using a first predetermined telecommunication protocol on a radio connection,
    a packet data network, external to said mobile communications system, wherein data to be transmitted is transmitted in data packets, according to a packet data network protocol specified for the packet data network, the packet data network protocol being other than the first predetermined telecommunication protocol,
    a server communicating with the mobile services switching center and said packet data network, the server being configured to arrange messages according to the first predetermined telecommunication protocol arranged as such into data packets according to said packet data network protocol and supplied from the mobile communication system to be forwarded through said packet data network to a terminal, the server being further configured to decompress messages according to the first telecommunication predetermined protocol arranged as such in the data packets according to said packet data network protocol and supplied from the terminal through the packet data network to be forwarded to the mobile communication system, and
    at least one terminal of a second wireless communication system, other than said mobile communication system, said terminal being arranged to support said packet data network protocol, the terminal being other than one of said mobile stations in the mobile communication system,
    the method comprising:
    establishing a telecommunication connection from said terminal to the mobile communication system by establishing a first part of said telecommunication connection from said terminal to said packet data network by using a second predetermined telecommunication protocol, other than said packet data network protocol and other than said first predetermined telecommunication protocol, through which a first part of the data packets according to said packet data network protocol are configured to be transmitted, the telecommunication connection comprising a second part from said packet data network to the mobile communication system via the server, through which the second part of the messages according to the first predetermined telecommunication protocol can be transmitted;
    transmitting and receiving by said terminal over said telecommunication connection established using the second predetermined telecommunication protocol the messages according to the first predetermined telecommunication protocol as the data in said data packets, the messages being arranged as such into the data packets according to said packet data network protocol; and
    emulating, by the terminal of said second wireless communication system, a mobile station of said mobile communication system.

2. The method as claimed in claim 1, further comprising establishing from said server a data transmission connection between the mobile services switching center and said packet data network, and authenticating, by said server, said terminal in response to a connection setup request transmitted by the mobile station or the terminal.

3. The method as claimed in claim 1, wherein said packet data network protocol is an IP protocol, whereby information on IP addresses of the terminals is maintained by said server, and data transmission directed to the terminals is routed according to said IP addresses.

4. The method as claimed in claim 1, further comprising connecting said terminal to a group call according to the mobile communication system using said first predetermined telecommunication protocol.

5. The method as claimed in claim 4, further comprising activating, from said server, said terminal into a group by establishing a connection to the terminal, and transmitting necessary group call numbers to the terminal in response to an activation request issued by the mobile communication system or the terminal.

6. The method as claimed in claim 5, further comprising connecting the terminal to the group call by transmitting a call setup message from said server to an IP address of the terminal.

7. The method as claimed in claim 5, further comprising initiating group call setup from said terminal by transmitting a call setup message to an IP address of the server.

8. The method as claimed in claim 6, further comprising
    transmitting a request for a speech item in the group call as fast signaling including a short message or a wireless application protocol (WAP) message, from said terminal to said server in response to a press of a push to talk (PTT) button specified in the terminal.

9. The method as claimed in claim 6, further comprising connecting to the group call several terminals which have established a telecommunication connection from said server to said packet data network by using the second predetermined telecommunication protocol.

10. The method as claimed in claim 4, further comprising connecting said terminal to several at least partly simultaneous group calls.

11. A telecommunication system for routing calls, the system comprising:
    a mobile communication system comprising at least one mobile services switching center and at least one base station connected thereto, and mobile stations arranged to establish a telecommunication connection to the mobile services switching center through the base station by using a first predetermined telecommunication protocol on a radio connection, a packet data network, external to said mobile communication system, wherein data to be transmitted is arranged to be transmitted in data packets according to a protocol specified for the packet data network, the packet data network protocol being other than the first predetermined telecommunication protocol, a server configured to communicate with the mobile services switching center and said packet data network, said server being configured to arrange messages according to the first predetermined telecommunication protocol supplied from the mobile services switching centre as such into data packets according to said packet data network protocol to be forwarded through said packet data network, the server being further configured to decompress messages according to the first predetermined telecommunication protocol arranged as such in the data packets according to said packet data network protocol and supplied from the packet data network to be forwarded to the mobile switching center, and at least one terminal of a second wireless communication system, other than said mobile communication system, arranged to establish a telecommunication connection to said mobile communication system through the packet data network and the server to the mobile switching center, said terminal being other than a mobile station of the mobile communication system, wherein said terminal is arranged to establish a first part of the telecommunication connection to said packet data network by using a second predetermined telecommunication protocol, other than said packet data network protocol and said first predetermined telecommunication connection, through which first part the data packets according to said packet data network protocol are configured to be transmitted, said terminal is arranged to transmit and receive in said data packets the messages according to the first predetermined telecommunication protocol arranged as such into the data packets according to said packet data network protocol, and the terminal of said second wireless telecommunication system is arranged to emulate a mobile station of said mobile communication system.

12. The telecommunication system as claimed in claim 11, wherein said server is arranged to establish a data transmission connection between the mobile services switching center and said packet data network, and to authenticate said terminal in response to a connection setup request transmitted by the mobile station or the terminal.

13. The telecommunication system as claimed in claim 11, wherein said packet data network protocol is an IP protocol, and said server is arranged to maintain information on IP addresses of the terminals and route data transmission directed to the terminals according to said IP addresses.

14. The telecommunication system as claimed in claim 13, wherein the maintenance of said IP addresses is arranged to be carried out according to a protocol supporting the mobility of the IP addresses.

15. The telecommunication system as claimed in claim 11, wherein said terminal is arranged to be connected to a group call according to the mobile communication system using said first predetermined telecommunication protocol.

16. The telecommunication system as claimed in claim 15, wherein said server is arranged to activate said terminal into a group by establishing a connection to the terminal and to transmit necessary group call numbers to the terminal in response to an activation request issued by the mobile communication system or the terminal.

17. The telecommunication system as claimed in claim 16, wherein said terminal is arranged to transmit a request for a speech item in the group call as fast signaling to said server in response to a press of a push to talk (PTT) button specified in the terminal connected to the group call.

18. The telecommunication system as claimed in claim 17, wherein said server is arranged to connect to the group call several terminals which have established a telecommunication connection to said packet data network by using the second predetermined telecommunication protocol.

19. The telecommunication system as claimed in claim 11, wherein said mobile communication system is a terrestrial trunked radio (TETRA) system and said terminal is configured to emulate a mobile station of the terrestrial trunked radio system, the terminal being one of the following:

a global system for mobile (GSM) terminal supporting general packet radio service (GPRS), a universal mobile telecommunication system (UMTS) terminal, a workstation of a local area network, a terminal according to a wireless network, including IEEE 802.11, or a terminal of a satellite telephone system.

20. A terminal configured to establish a telecommunication connection to a mobile communication system through a packet data network of a first communication system and a server instead of a direct connection to the mobile communication system, the telecommunication connection comprising a first part between the terminal and the packet data network for transmitting and, receiving data in data packets, and a second part between the packet data network and the mobile communication system, the terminal comprising:

a transceiver configured to use a packet data network protocol of the first communication system to receive and transmit data in data packets over the packet data network on the first part of the connection; and an emulator configured to emulate a mobile station of the mobile communication system by transmitting and receiving in said data in data packets messages according to a first predetermined telecommunication protocol of the mobile communication system, the first predetermined telecommunication protocol being other than said packet data network protocol and used in the mobile communication system to receive and transmit data, wherein the terminal is further configured:

to perform call control signaling through said packet data network to said server, to decompress speech frames and signaling messages according to said first predetermined telecommunication protocol in data packets according to said protocol specified for the packet data network, to decrypt encryption in the received frames according to the first predetermined telecommunication protocol, to encrypt the frames to be transmitted according to the first predetermined telecommunication protocol, to block de-interleave and unmix the decrypted frames, to block interleave and mix the frames to be transmitted, and to encode and decode channel and speech coding.

21. The terminal as claimed in claim 20, wherein
the terminal is further configured to be connected to a group call according to the mobile communication system using said first predetermined telecommunication protocol.

22. The terminal as claimed in claim 21, wherein
the terminal is further configured to issue an activation request to said server for participating in the group call and to receive necessary group call numbers.

23. The terminal as claimed in claim 20, wherein
the terminal is further configured to be connected to several at least partly simultaneous group calls.

24. The terminal as claimed in claim 20, wherein
the emulator is configured to emulate a mobile station of a terrestrial trunked radio (TETRA) system, and the terminal is one of the following:
a global system for mobile (GSM) terminal supporting general packet radio service (GPRS),
a universal mobile telecommunication system (UMTS) terminal,
a workstation of a local area network,
a terminal according to a wireless network, or
a terminal of a satellite telephone system.

* * * * *